US011950057B2

(12) United States Patent
Jensen et al.

(10) Patent No.: US 11,950,057 B2
(45) Date of Patent: Apr. 2, 2024

(54) HEARING DEVICE COMPRISING A SPEECH INTELLIGIBILITY ESTIMATOR

(71) Applicant: Oticon A/S, Smørum (DK)

(72) Inventors: Jesper Jensen, Smørum (DK); Asger Heidemann Andersen, Frederikssund (DK)

(73) Assignee: Oticon A/S, Smørum (DK)

( * ) Notice: Subject to any disclaimer, the term of this patent is extended or adjusted under 35 U.S.C. 154(b) by 109 days.

(21) Appl. No.: 17/840,172

(22) Filed: Jun. 14, 2022

(65) Prior Publication Data

US 2022/0400349 A1 Dec. 15, 2022

(30) Foreign Application Priority Data

Jun. 15, 2021 (EP) .................................... 21179577

(51) Int. Cl.
*H04R 25/00* (2006.01)
*G10L 25/78* (2013.01)

(52) U.S. Cl.
CPC ............ *H04R 25/507* (2013.01); *G10L 25/78* (2013.01); *G10L 2025/786* (2013.01); *H04R 2225/41* (2013.01)

(58) Field of Classification Search
CPC ... H04R 25/507; H04R 2225/41; G10L 25/78; G10L 2025/786
See application file for complete search history.

(56) References Cited

U.S. PATENT DOCUMENTS

2017/0272870 A1* 9/2017 Andersen ................ G10L 25/06

FOREIGN PATENT DOCUMENTS

EP 3 057 335 A1 8/2016
EP 3 203 473 A1 8/2017
(Continued)

OTHER PUBLICATIONS

Baumgärtel et al., "Comparing Binaural Pre-processing Strategies I: Instrumental Evaluation", Trends in Hearing, vol. 19, 2015, pp. 1-16.

(Continued)

*Primary Examiner* — Mark Fischer
(74) *Attorney, Agent, or Firm* — Birch, Stewart, Kolasch & Birch, LLP

(57) ABSTRACT

A hearing device, e.g. a hearing aid, comprises a) an input unit configured to provide at least one time-variant electric input signal representing sound, the at least one electric input signal comprising target signal components and optionally noise signal components, the target signal components originating from a target sound source; b) a signal processing unit for processing the at least one electric input signal and providing a processed signal; c) an output unit for creating output stimuli configured to be perceivable by the user as sound based on the processed signal from the signal processing unit; d) a speech presence probability prediction unit for repeatedly providing a measure of a predicted speech presence probability of the at least one electric input signal, or of a signal originating therefrom; and e) a speech intelligibility prediction unit for repeatedly providing a current measure of a predicted speech intelligibility of the at least one electric input signal, or of a signal originating therefrom. The speech intelligibility prediction unit is configured to determine said current measure of the predicted speech intelligibility in dependence of said measure of the predicted speech presence probability. A method of operating a hearing device is further disclosed. The invention may e.g. be used in hearing aids, headsets, earpieces (ear buds), etc.

20 Claims, 6 Drawing Sheets

(56) References Cited

FOREIGN PATENT DOCUMENTS

| | | | |
|---|---|---|---|
| EP | 3 220 661 | A1 | 9/2017 |
| EP | 3 514 792 | A1 | 7/2019 |
| EP | 3 598 777 | A2 | 1/2020 |

OTHER PUBLICATIONS

Extended European Search Report issued in Application No. 21179577.8, dated Dec. 7, 2021.

Hoang et al., "Joint Maximum Likelihood Estimation of Power Spectral Densities and Relative Acoustic Transfer Functions for Acoustic Beamforming", IEEE International Conference on Acoustics, Speech and Signal Processing (ICASSP), 2021, pp. 6119-6123.

Jensen et al., "An Algorithm for Predicting the Intelligibility of Speech Masked by Modulated Noise Maskers", IEEE/ACM Transactions on Audio, Speech, and Language Processing, vol. 24. No. 11, 2016, pp. 2009-2022.

Martín-Doñas et al., "Online Multichannel Speech Enhancement Based on Recursive EM and DNN-Based Speech Presence Estimation", IEEE/ACM Transactions on Audio, Speech, and Language Processing, vol. 28, 2020, pp. 3080-3094.

Edraki et al., "Speech Intelligibility Prediction Using Spectro-Temporal Modulation Analysis", IEEE/ACM Transactions on Audio, Speech, and Language Processing, vol. 29, 2021, pp. 210-225.

Heymann et al., "A Generic Neural Acoustic Beamforming Architecture for Robust Multi-Channel Speech Processing", Computer Speech and Language, Oct. 12, 2016, pp. 1-20.

Pedersen et al., "A Neural Network for Monaural Intrusive Speech Intelligibility Prediction", ICASSP, May 2020, pp. 336-340.

* cited by examiner

HEARING DEVICE COMPRISING A SPEECH INTELLIGIBILITY ESTIMATOR

TECHNICAL FIELD

The present application relates to hearing devices, in particular hearing aids or headsets.

A primary aim of any hearing aid system is to improve the ability of the user to understand speech. This is done by amplifying incoming sounds and by attempting to remove unwanted noise and distortion. While amplification can improve intelligibility in quiet environments, it is necessary to employ high performing noise reduction and speech enhancement algorithms in noisy situations.

An estimate of user's intelligibility of speech present in a current (noisy) input signal is a valuable parameter for use in deciding an appropriate current processing of the input signal.

SUMMARY

The present disclosure proposes to estimate the intelligibility of a speech signal based on voice activity detection—or more generally, speech presence probability (SPP)—a quantity known from the area of speech enhancement. Intuitively, it seems reasonable that speech intelligibility is high, if a detection algorithm detects the presence of speech with high probability—and vice versa.

The present disclosure relates to signal processing methods for predicting the intelligibility of speech, e.g., in the form of an index, i.e., a number (scalar) that correlates highly with the fraction of words that an average listener would be able to understand from some speech material. Specifically, solutions are presented to the problem of predicting the intelligibility of speech signals, which are distorted, e.g., by noise or reverberation, and which might have been passed through some signal processing device, e.g., a hearing device, such as a hearing aid. The invention is characterized by the fact that the intelligibility prediction is based on the noisy/processed signal only—in the literature, such methods are called non-intrusive intelligibility predictors, cf. e.g. EP3057335A1, EP3203473A1.

The non-intrusive class of methods, which we focus on in the present invention, is in contrast to the much larger class of methods which require a noise-free and unprocessed reference speech signal to be available too (e.g. [ANSI; 1995], [Rhebergen & Versfeld; 2005], [Taal et al.; 2011], EP3220661 A1, etc.)—this class of methods is called intrusive.

The use of a speech intelligibility measure to check the performance of a hearing aid processing algorithm, e.g. for enhancing speech (e.g. a noise reduction algorithm), has been proposed, cf. e.g. [Hoang et al.; 2021], [Martin-Donas et al.; 2020], [BaumgArtel et al.; 2015]. These references do not, however, as proposed in the present disclosure, use a speech presence probability measure to determine the speech intelligibility measure.

The proposed hearing device allows an estimation of the intelligibility experienced by—for example—a hearing aid user, at a given moment in time. This knowledge can be used for various purposes, e.g., adaptation of the signal processing schemes employed in the hearing device (HD), for example a noise reduction algorithm, such as a beamformer/noise reduction algorithm in order to increase intelligibility (perhaps at the cost of suppressing more background noise in the incoming signal, and, hence, isolating the user from acoustic environment) or, oppositely, or to decrease the aggressiveness of a noise reduction system, because intelligibility is already sufficient. Obviously, adaptation of other algorithms in the hearing device (HD) can also or alternatively be envisaged.

A Hearing Aid:

In an aspect of the present application, a hearing device, e.g. a hearing aid, adapted for being worn by a user is provided. The hearing device comprises

- an input unit configured to provide at least one time-variant electric input signal representing sound, the at least one electric input signal comprising target signal components and optionally noise signal components, the target signal components originating from a target sound source;
- a signal processing unit for processing the at least one electric input signal (e.g. based on configurable processing parameters) and providing a processed signal;
- an output unit for creating output stimuli configured to be perceivable by the user as sound based on the processed signal from the signal processing unit;
- a speech presence probability prediction unit for repeatedly providing a measure of a predicted speech presence probability of the at least one electric input signal, or of a signal originating therefrom; and
- a speech intelligibility prediction unit for repeatedly providing a current measure of a predicted speech intelligibility of the at least one electric input signal, or of a signal originating therefrom.

The speech intelligibility prediction unit may be configured to determine the current measure of the predicted speech intelligibility in dependence of the measure of the predicted speech presence probability.

Thereby an improved hearing device, e.g. a hearing aid, may be provided.

The terms 'predicted speech presence probability' and 'estimated speech presence probability' (or 'measure of' said items) are used interchangeably in the present disclosure without any intended difference in meaning. Likewise, the terms 'predicted speech intelligibility' and 'estimated speech intelligibility' (or 'measure of' said items) are used interchangeably in the present disclosure without any intended difference in meaning. Likewise, the terms 'speech intelligibility estimator' and 'speech intelligibility predictor' are used interchangeably in the present disclosure without any intended difference in meaning. Likewise, the terms 'speech presence probability estimator' and 'speech presence probability predictor' are used interchangeably in the present disclosure without any intended difference in meaning.

The hearing device, e.g. the speech presence probability prediction unit, may be configured to repeatedly over time provide said measure of the predicted speech presence probability. The predicted speech presence probability may e.g. be provided with a well-defined (e.g. pre-determined, or adaptively determined) repetition frequency, e.g. related to a characteristic time unit of the hearing device, e.g. of the input unit. The current measure of the predicted speech intelligibility may be a function ($f(.)$)(at least) of the measure of the predicted speech presence probability (but may be influenced by other parameters as well).

The speech intelligibility prediction unit may be configured to determine the current measure of the predicted speech intelligibility as a function ($f(.)$) of a present value and a number of (e.g. recent) past values of said measure of the predicted speech presence probability. The number of recent past values may be the last M−1 past values of the predicted speech presence probability. The value of M may be related to characteristic elements of speech, e.g. syllables, or words, or sentences. Typical values of M may correspond to time durations of one or more sentences. Typical values of M may correspond to time durations of (e.g. at least) 100 ms, 200 ms, 500 ms, 1 s, 5 s, or 10 s, or 20 s or more. A time unit of the time index m may be the length of a time frame, or a fraction thereof (e.g. ½, if overlap is 50%), e.g. of the order of 1 ms.

The hearing device may comprise a mapping unit configured to provide a mapping of the at least one electric input signal from a first domain having a first dimension to a second domain having a second dimension, wherein the mapping is a non-linear or linear mapping, and wherein the second dimension is equal to or different from said first dimension. The first domain may have a first dimension (P). The second domain may have a second dimension (Q). P may be smaller than or equal to or larger than Q. A linear mapping may e.g. be represented by a Fourier transform. A non-linear mapping may e.g. be represented by a a neural network. The first domain may e.g. be the time-domain. The first dimension may e.g. be represented by a number (P) of time samples 'stacked' in a frame of the electric input signal. The first domain may e.g. be the (time-)frequency domain. The first dimension may e.g. be represented by a number (P) of time-frequency tiles 'stacked' in a frame of the electric input signal. The second domain may e.g. be the (time-) frequency dimension. The second dimension may e.g. be represented by a number (Q) of time-frequency tiles 'stacked' 'in a frame of the electric input signal.

The input unit may be configured to provide the at least one electric input signal in a transform domain representation. The hearing device, e.g. the input unit, and or an antenna and transceiver unit configured to receive one or more of the at least one electric input signal may comprise a transform unit for converting a time domain signal to a signal in the transform domain (e.g. a frequency domain, a Cosine transform domain, etc.). The transform unit may be constituted by or comprise a time-frequency-conversion unit for providing a time-frequency representation of an input signal. The speech presence probability may be provided in a transform domain. The current measure of the predicted speech intelligibility may be provided in a transform domain.

The input unit may be configured to provide the at least one electric input signal in a time-frequency representation (km), k being a frequency band index, m being a time index. The hearing device, e.g. the input unit, may comprise at least one analysis filter bank configured to provide said at least one electric input signal in a time-frequency representation (km), k being a frequency band index, m being a time index. The analysis filter bank may comprise a Fourier transform algorithm for transforming a time domain signal to number of frequency sub-band signals in the time-frequency domain (k,m). The hearing device, e.g. the input unit, may comprise at least one analogue to digital converter for converting an analogue electric input signal to a digitized electric input signal (as a stream of digitized audio samples), e.g. with a certain sample frequency, e.g. 20 kHz.

Speech Presence Probabilities may also be provided in other domains than the time-frequency (e.g. short-time Fourier Transform) domain, for example:

i) the time domain, in which a voice activity detection algorithm is applied to successive time frames, leading to SPPs, $P_m$,
ii) other linear transform domains, i.e., where the STFT is substituted by other transforms such as the Discrete Cosine Transform (DCT) or the Karhunen Loéve Transform (KLT), leading to SPP estimates $P_{k,m}$, where k denotes a transform coefficient index and m is a time index as usual,
iii) Cepstral domain, in which a Fourier transform is applied to log STFT-amplitudes across frequency. We operate with SPPs $P_{k,m}$, where k is the cepstral coefficient index and m is a time index as usual.
iv) Temporal Modulation domain, in which a Fourier transform is applied to STFT amplitudes or log-amplitudes across time. We then operate with SPPs, $P_{k,m,l}$, where k and m denote STFT freq. and time as usual, but index l is temporal modulation frequency index.
v) Spectro-Temporal modulation domain in which a Fourier transform is applied to STFT amplitudes or log-amplitudes across time and frequency. We get $P_{k,m,l,q}$, where q is spectral modulation frequency index and everything else is as in iv) above.
vi) Etc.

For these domains, SPPs are integrated across all dimensions including the recent past, m-M+1:M (this is completely analogous to the STFT domain situation), in order to provide temporal SI estimates.

The speech presence probability prediction unit may be configured to determine the current measure of the predicted speech intelligibility in a number of time frequency units (km). The speech presence probability prediction unit may be configured to determine the current measure of the predicted speech intelligibility in a multitude of time frequency units (k,m) of a given time frame m', where k=1, . . . , K.

A time-frequency tile exhibiting a predicted speech presence probability (SPP) close to 1 (SPP(k,m)=1) may be assigned a predicted speech intelligibility (SI) of close to 100% (SI(k,m) 100%). The predicted speech presence probabilities SPP(k,m') for a given time frame (m') may be combined to provide a consolidated speech presence probability SPP(l') or for a number L of time frames, e.g. for frame m' and the L−1 previous time frames. A single estimate of speech intelligibility of a given time frame (m) may be based a) on said individual speech presence probabilities SPP(k,m') of the given time frame (m'), b) on said consolidated speech presence probability SPP(m') for the given time frame (m'), or c) including historic values (e.g. L−1 previous values relative to the given time frame (m')) of said individual speech presence probabilities SPP(km), or of said consolidated speech presence probability SPP(m').

The speech intelligibility prediction unit may be configured to determine the current measure of the predicted speech intelligibility as a function of a present value and a number of past values of the measure of the predicted speech presence probability, wherein the present value and the number of past values is M×K, where M is a number of time units and K is a number of frequency units. The number M may include the current time frame and the M−1 frames preceding the current time frame. In a time-frequency representation, the current measure of the predicted speech intelligibility $\hat{I}_m$ may be determined as $$\hat{I}_m = f(P_{k,m'}),\ k=1, \ldots, K;\ m'=m-M+1, \ldots m,$$

where $P_{k,m'}$ denotes the measure of the predicted speech presence probability at the $k^{th}$ frequency index and $m'^{th}$ index, in K frequency channels and M observations in the recent past, and $f(.)$ denotes a function that maps the measure of the predicted speech presence probability to the current measure of the predicted speech intelligibility, cf. e.g. FIG. 3. The number K may be the K frequency subbands of the filter bank, or a subset thereof, e.g. a proper subset thereof, representing a limited frequency range compared to the frequency range covered by the frequency bands of the analysis filter bank), or a decimated number of frequency bands, e.g. covering the full frequency range of the analysis filter bank, but where at least some of the frequency bands are wider than the frequency bands of the filter-bank. A limited number of frequency bands may e.g. be selected with a view to frequencies that are considered important for speech intelligibility, e.g. frequencies below 8 kHz (e.g. between 250 Hz and 6 kHz, e.g. selected with a view to the user's hearing ability (and/or the degree of compensation provided by the hearing device, e.g. a hearing aid (e.g. by a hearing loss compensation algorithm)).

The speech intelligibility prediction unit may be configured to determine the current measure of the predicted speech intelligibility in dependence of an, optionally normalized, sum of the present value and the number of past values of the measure of the predicted speech presence probability. The number of past values (M−1) may be larger than one, e.g. larger than two, such as larger than five, e.g. larger than ten. The number of past values (M−1) may e.g. correspond to a duration of a speech element, e.g. a syllable or word. The function ($f$(.) referred to above may thus be arithmetic average. In a time-frequency representation, the current measure of the predicted speech intelligibility Îm may be determined as a sum of the values of the measure of the predicted speech presence probability $P_{k,m}$ for the K frequency units of the M last time (frame) units (i.e. K×M-values), e.g. determined as an arithmetic average $$\hat{I}_m = \frac{1}{M}\frac{1}{K}\sum_{k=1}^{K}\sum_{m'=m-M+1}^{m} P_{k,m'}.$$

where is m is the current time (frame) index.

The speech intelligibility prediction unit may be configured to determine the current measure of the predicted speech intelligibility in dependence of a weighted sum of the present value and the number of past values of the measure of the predicted speech presence probability. The function $f$(.) referred to above may thus be weighted sum. The sum of the weights may be equal to one. Other functions may be logarithmic transform. The function $f$(.) may provide a compressive transform. The function $f$(.) may provide a quantization of the measure of the predicted speech presence probability $P_{k,m}$. The function $f$(.) may provide a max-pooling of the (e.g. K×M) present and recent past values of the measure of the predicted speech presence probability values, $P_{k,m}$.

The hearing device may be configured to provide that the function ($f$(.)) is a data-driven model, learned from training data.

The hearing device may be configured to provide that the function $f$(.) is provided by a deep neural network whose parameters are learned offline—before use of the hearing device—using training data comprising estimated speech presence probabilities $P_{k,m'}$, k=1, . . . , K; m'=m−M+1, . . . m, for a particular noisy or processed time segment of a speech signal along with ground truth speech intelligibility of that speech segment. The ground truth speech intelligibility of that speech segments used for training (i.e., desired output of the data-driven model $f$(.)) may e.g. be measured in listening tests with human test subjects. Details of the approach for training deep neural networks for intelligibility prediction is e.g. described in [Pedersen et al.; 2020], but this work differs from the proposed approach, because it does not rely on speech presence probabilities and assumes access to a noise-free reference signal.

The hearing device may comprise a control unit (e.g. a controller) configured to provide appropriate parameters (e.g. processing parameters) for use in the processing of the at least one electric input signal in dependence of the current estimate (currently predicted measure) of speech intelligibility.

The signal processing unit may comprise at least one processing algorithm configured to be applied to an input signal to the signal processing unit (e.g. the at least one electric input signal or a signal or signals originating therefrom). The at least one processing algorithm may comprise a noise reduction algorithm, e.g. comprising a directional system (beamformer). The controller may be configured to provide one or more processing parameters of the at least one processing algorithm. The one or more processing parameters may be provided in dependence of the current measure of the predicted speech intelligibility.

The input unit may be configured to provide at least two time-variant electric input signals representing sound. The hearing device (e.g. a hearing aid) may comprise a beamformer configured to provide a beamformed signal in dependence of the at least two time-variant electric input signals and fixed or adaptively updated beamformer weights. The hearing device may comprise a controller. The controller may be configured to control the beamformer (e.g. via the beamformer weights) in dependence of the estimate of speech intelligibility L.

The controller may be configured to control the beamformer weights $w_{ij}$(k,m) in dependence of Î(m) to increase omni-directionality of the beamformer, the higher the estimate of speech intelligibility Î(m). Correspondingly, the beamformer weights may be controlled to increase focus of the beamformer, the lower the estimate of speech intelligibility Î(m).

The hearing device may be constituted by or comprise a hearing aid, a headset, an earphone, an ear protection device, or a combination thereof.

The hearing device may be constituted by or comprise an air-conduction type hearing aid, a bone-conduction type hearing aid, a cochlear implant type hearing aid, or a combination thereof.

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system may be adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry allowing a wireless link to an entertainment device (e.g. a TV-set), a communication device (e.g. a telephone), a wireless microphone, or another hearing device, etc. The hearing device may thus be configured to wirelessly receive a direct electric input signal from another device. Likewise, the hearing device may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing device can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 300 g, such as less than 100 g, such as less than 20 g.

The hearing device may comprise a 'forward' (or 'signal') path for processing an audio signal between an input and an output of the hearing device. A signal processor may be located in the forward path. The signal processor may be adapted to provide a frequency dependent gain according to a user's particular needs (e.g. hearing impairment). The hearing device may comprise an 'analysis' path comprising functional components for analyzing signals and/or controlling processing of the forward path. Some or all signal processing of the analysis path and/or the forward path may be conducted in the frequency domain, in which case the hearing device comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at to by a predefined number $N_b$ of bits, $N_b$ being e.g. in the range from 1 to 48 bits, e.g. 24 bits. Each audio sample is hence quantized using $N_b$ bits (resulting in $2^N$ different possible values of the audio sample). A digital sample x has a length in time of $1/f_s$, e.g. 50 ρs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing device may comprise a digital-to-analogue (DA) converter to convert a digital signal to an analogue output signal, e.g. for being presented to a user via an output transducer.

The hearing device, e.g. the input unit, and or the antenna and transceiver circuitry may comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

The classification unit may be based on or comprise a neural network, e.g. a trained neural network.

The hearing device may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, active noise control, etc.

The hearing device may e.g. comprise a hearing aid (such as a hearing instrument, e.g. a hearing instrument adapted for being located at the ear or fully or partially in the ear canal of a user), a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device as described above, in the 'detailed description of embodiments' and in the claims, is moreover provided. Use may be provided in a system comprising one or more hearing devices (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing device adapted for being worn by a user is furthermore provided by the present application. The method comprises

- providing at least one time-variant electric input signal representing sound, the at least one electric input signal comprising target signal components, and optionally noise signal components, the target signal components originating from a target sound source;
- processing the at least one electric input signal and providing a processed signal;

creating output stimuli configured to be perceivable by the user as sound based on the processed signal;

repeatedly providing a measure of a predicted speech presence probability of the at least one electric input signal, or of a signal originating therefrom; and repeatedly providing a measure of a predicted speech intelligibility of the at least one electric input signal, or of a signal originating therefrom.

The method may further comprise determining said current measure of the predicted speech intelligibility in dependence of said measure of the predicted speech presence probability.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing device as described above, in the 'detailed description of embodiments', and in the claims, AND an auxiliary device is moreover provided.

The hearing system may be adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing device(s). The function of a remote control may be implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device. The hearing system may comprise two hearing devices adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. The APP may be configured to run on cellular phone, e.g. a smartphone, or on another portable device allowing communication with said hearing device or said hearing system.

Definitions

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as hearing aids, headsets, earpieces (ear buds), etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids, headsets, ear buds, etc.

The present disclosure proposes to estimate the probability of speech presence in certain parts, e.g. in disjoint time-frequency regions of an input speech signal s(t), t representing time. The estimated speech presence probabilities (SPPs) from a particular temporal neighborhood are combined into a speech intelligibility index $\hat{I}_m$, where m is a time index, that reflects the intelligibility of the signal neighborhood in question, cf. FIG. 1.

Figure 1:
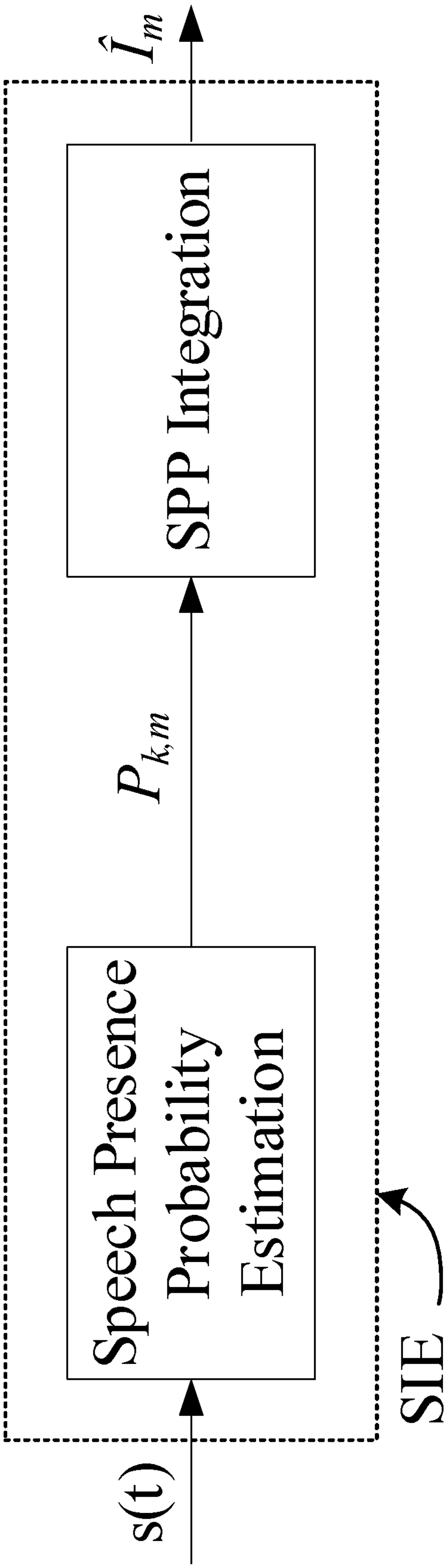
FIG. 1 shows an exemplary speech intelligibility estimator (or predictor) according to the present disclosure comprising an input speech signal s(t) that is analyzed to estimate speech presence probabilities, SPPs ($P_{k,m}$), and wherein the estimated SPPs are further processed to provide an estimate $\hat{I}_m$ of a current speech intelligibility, FIG. 2 schematically illustrates speech presence probabilities ($P_{k,m}$) in a time frequency domain, FIG. 3 schematically shows that the proposed speech intelligibility index $\hat{I}_m$ for time instant m is a function of SPPs ($P_{k,m}$) from the present and recent past (defined by parameter M), FIG. 4A, 4B schematically illustrate a simple example of max-pooling with M=5, K=5, k0=1, m0=1, where FIG. 4A) shows SPPs ($P_{k,m}$) before Max-pooling.

FIG. 1 shows an exemplary speech intelligibility estimator according to the present disclosure comprising an input $speech_{signal}$ s(t) that is analyzed to estimate speech presence probabilities, SPPs ($P_{k,m}$), and wherein the estimated SPPs are further processed to provide an estimate Îm of a current speech intelligibility. In FIG. 1, $P_{k,m}$ represent SPPs estimated for a time index m and a frequency channel k for ease of illustration—SPPs estimated in other domains could be used (see e.g. FIG. 6A below). SPPs are processed (e.g. integrated or combined) to form a speech intelligibility index $\hat{I}_m$ which correlates highly with the intelligibility of the speech signal, measured in the vicinity of time index m.

In the present application, the notation '$P_{k,m}$' and 'P(k,m)' is used interchangeably for the speech presence probability (depending on indices k, and m, or other indices) without any intended difference in meaning between the two.

By "intelligibility index" we mean a number (scalar) as a function of time that correlates highly with true intelligibility of the speech signal in question as a function of time—as perceived by a group of listeners or a particular individual. In other words, when the true underlying intelligibility is high at a particular point in time, so is $\hat{I}_m$, and vice versa. In our proposal, $0 \le \hat{I}_m \le 1$, where "1" means "high intelligibility".

In FIG. 1 it is assumed that the input speech signal is decomposed into the time-frequency domain, i.e., by a filter bank (e.g. a short-time Fourier Transform (STFT) filter bank) in order to estimate the speech presence probability $P_{k,m}$ in each time-frequency tile. However, the proposed idea is not necessarily limited to the time-frequency domain. For example, the proposed idea could also operate using a spectro-temporal decomposition of the incoming speech signal (see e.g. [Edraki et al.; 2020] for an example), etc. In this case, the ordinary filter bank is replaced by a spectro-temporal filter bank, and SPPs would be estimated on a short-time basis for each spectro-temporal filter channel. Other domains could be envisaged.

Various input signals s(t) could be envisaged for the proposed algorithm. In one embodiment, the input signal s(t) to the proposed algorithm could be a microphone signal of the hearing device—in this case, the proposed algorithm provides an estimate $\hat{I}_m$ of the intelligibility of that microphone signal as a function of time t. In another embodiment, the input to the algorithm consists of several microphone signals used for SPP estimation (see below)—in this case the output $\hat{I}_m$ of the proposed algorithm typically reflects the intelligibility of one of the microphone signals (decided upon in advance, e.g. a reference microphone signal of a beamformer). In a third embodiment, the input signal s(t) to the proposed algorithm is the output signal of the hearing aid system, i.e., the signal to be presented for the hearing aid user. In this case, $\hat{I}_m$ reflects the intelligibility experienced by the hearing aid user, when listening to the output signal.

SPP estimation from noisy speech signals is a well-known discipline in the area of single- and multi-microphone speech enhancement (see e.g. [Hoang et al.; 2021] for a recent proposal). Most methods work in a spectral domain, e.g., via a short-time Fourier Transform and provides SPP estimates for each and every time-frequency coefficient. For each time-frequency tile, the estimated probabilities tend towards 0, if there is no speech present, or if there is speech present, but it is dominated by noise, and tend towards 1, if speech is clearly present.

Figure 2:
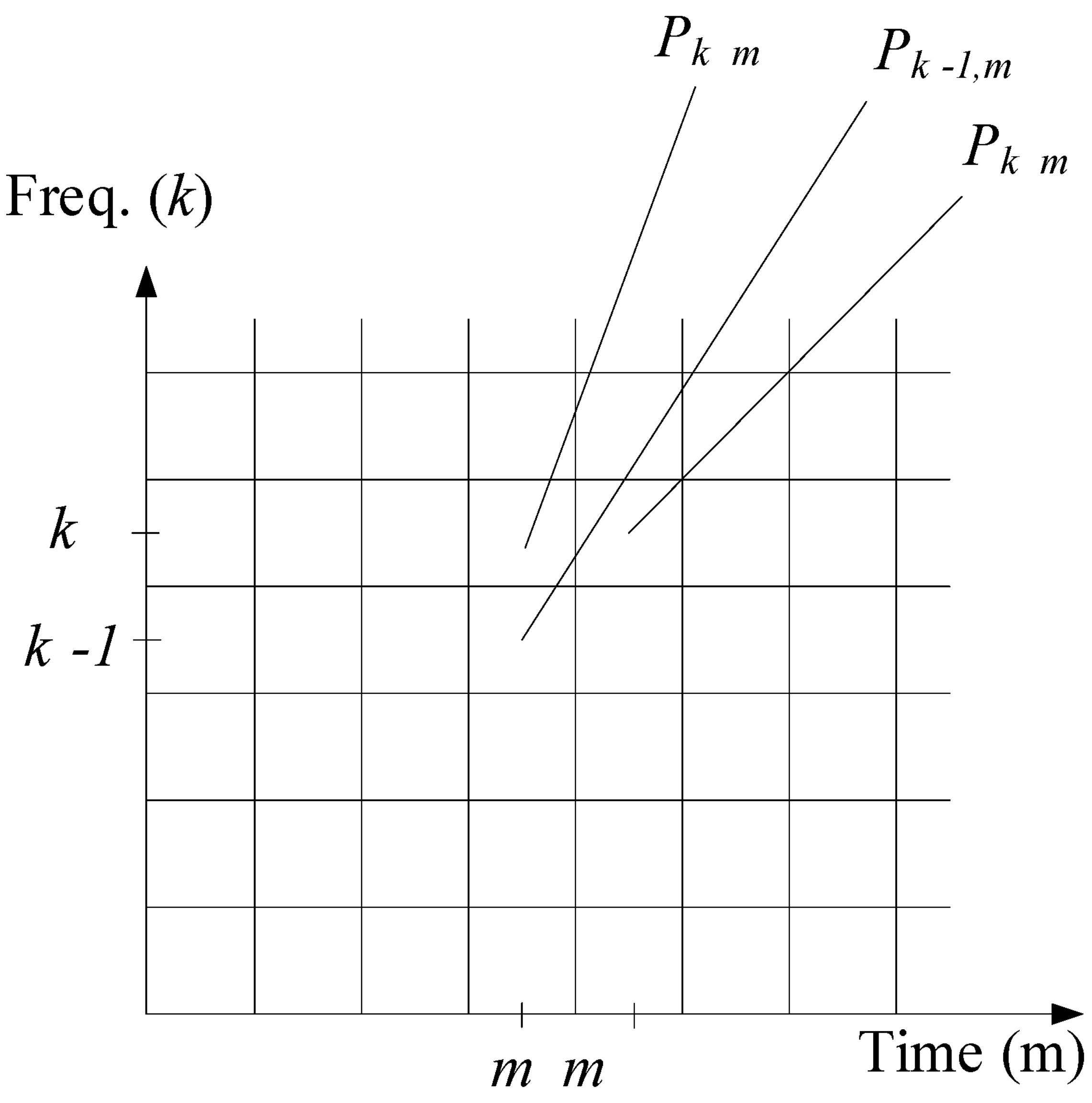

FIG. 2 schematically illustrates speech presence probabilities ($P_{k,m}$) in a time frequency domain.

SPP estimation methods can be categorized into the following broad classes:

a) statistical model-based methods (e.g., [Hoang et al.; 2021], Chapter 5) and the references therein), which rely on statistical assumption wrt. speech and noise signals, b) (deep) learning based methods, e.g., EP3598777A2, in which SPPs are estimated using a data-driven (trained) SPP estimator, and c) hybrid methods, e.g. where monaural DNN-based SPP estimates are refined using a statistical spatial model or the other way around.

Alternatively, SPP estimation methods can be categorized into algorithms that a) use a single input signal (see e.g., [Hoang et al.; 2021]) and the references therein, and [Heymann, et al.; 2017].

b) use multiple input signals to estimate SPPs in one of them, e.g., [Heymann, et al.; 2017]).

The speech intelligibility prediction scheme according to the present disclosure is not limited to use SPPs estimated for each coefficient in the time-frequency domain, although this is the domain in which SPP estimation is typically performed in the literature. It is equally possible to envisage schemes where SPPs—for example—are related to coefficients in the spectro-temporal modulation domain. In this case, the signal under analysis may be decomposed using a spectro-temporal modulation filter bank (e.g., as proposed in [Edraki et al.; 2020]), e.g. applied to a linear-amplitude or a log-amplitude spectrogram.

Figure 3:
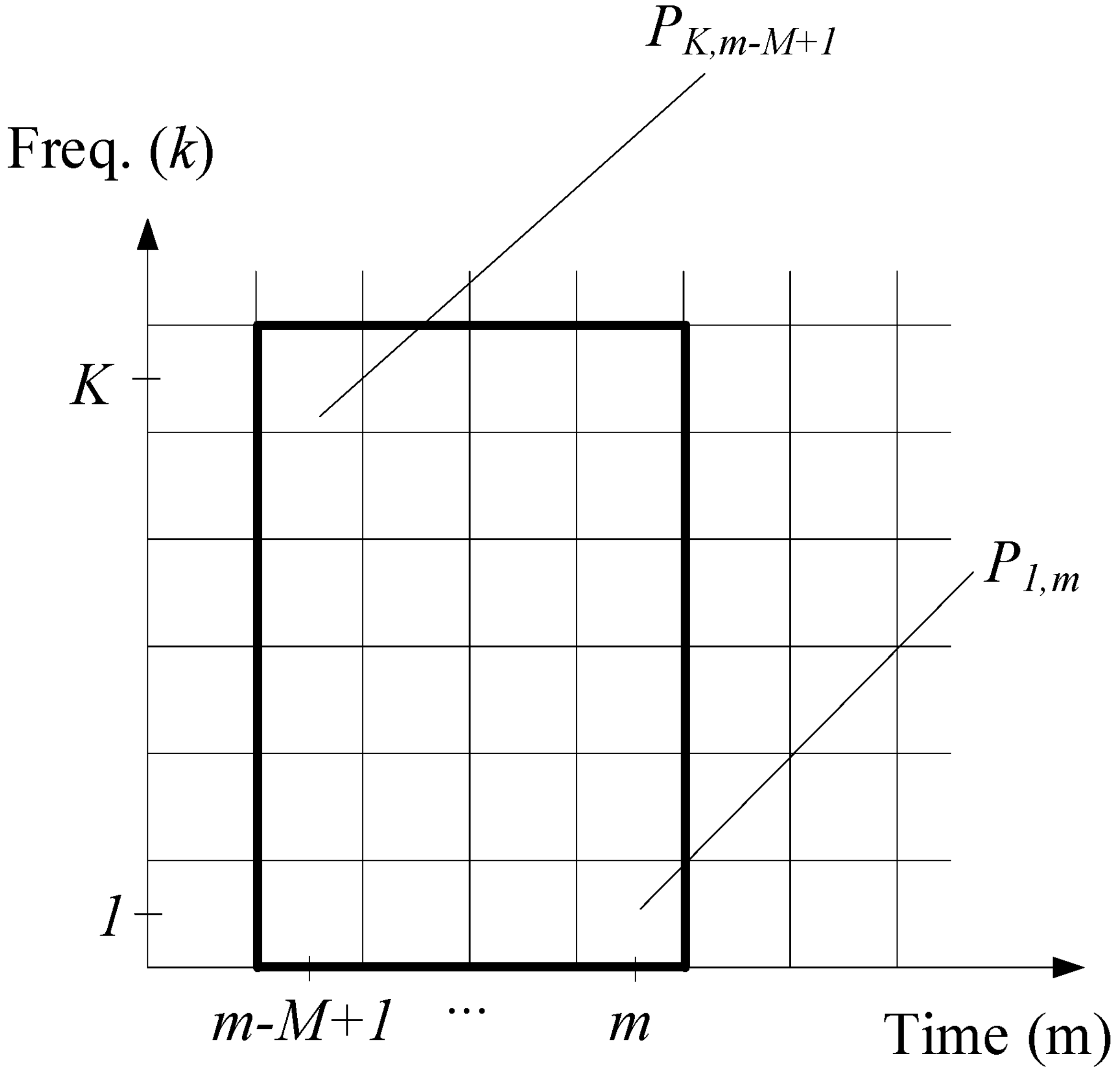

The present disclosure proposes to combine the estimated SPPs from the recent past to form an intelligibility index reflecting the intelligibility of the speech signal across this recent past, i.e., $$I_m = f(P_{k,m'}), k=1, \ldots, K;\ m'=m-M+1, \ldots m,$$

where $P_{k,m'}$ denotes the SPP estimate at the k'th frequency index and m''th time index, we assume there are K frequency channels and M observations in the recent past, and $f(.)$ denotes a function that maps the SPPs to an intelligibility index, cf. FIG. 3. Essentially, $f(.)$ is chosen as a non-decreasing map, such that if one of the elements $P_{k,m'}$, k=1, . . . , K; m'=m−M+1, . . . m, increases, then $\hat{I}_m = f(P_{k,m'})$, k=1, . . . , K; m'=m−M+1, . . . m, does not decrease (see below for examples of the function $f(.)$).

FIG. 3 schematically shows that the proposed speech intelligibility index Îm for time instant m is a function of SPPs (Pk,m) from the present and recent past (defined by parameter M).

Alternatively, the intelligibility index $\hat{I}_m$ reflecting the intelligibility at time instant m is a function of recent past and near future SPPs wrt. the time index m. The parameter M, which defines the time duration upon which $\hat{I}_m$ is based, is chosen according to the application. Typical values of M correspond to time durations of 100 ms, 200 ms, 500 ms, 1 s, 5 s, 10 s, or more. In some applications, M could correspond to the duration of a speech signal or a set of speech signals.

The simplest form of the function $f(.)$ is to simply form an intelligibility index estimate from an arithmetic average of the SPPs of the recent past.

$$\hat{I}_m = \frac{1}{M}\frac{1}{K}\sum_{k=1}^{K}\sum_{m'=m-M+1}^{m} P_{k,m'}.$$

Another slightly more general approach is to introduce frequency weights $$\hat{I}_m = \frac{1}{M}\frac{1}{K}\sum_{k=1}^{K}\sum_{m'=m-M+1}^{m} w_k P_{k,m'},$$

where $w_k$ are pre-determined weight factors. Often, we use pre-determined weights that indicate proportionate importance of different frequency bands, i.e., $0 \leq w_k \leq 1$ and $\Sigma_k w_k = 1$.

In another embodiment, the SPPs are transformed, before they are combined, e.g., using a log-transform, $P_{k,m} := \log(P_{k,m} + c1)$, where c1 is a small number to avoid numerical problems in computing log(.) for very low SPPs. Other transformation could be envisaged, e.g., compressive transforms such as square roots, etc.

In yet another embodiment, the SPPs are quantized, before they are combined, e.g. using a 2-level quantizer, $P_{k,m} := 1$ if $P_{k,m} > c2$ and $P_{k,m} = 0$ otherwise.

In yet another embodiment, the SPPs $P_{k,m}$ are passed through a max-pool map, before combined. A max-pool map replaces a given SPP, say $P_{k,m}$, by the maximal SPP in its vicinity, e.g., $P_{k,m} := \max P_{k',m'}$, k'=k−k0, . . . , k'=k+k0, m'=m−m0, . . . , m+m0, see FIG. 4 for a small example.

Figure 4B:
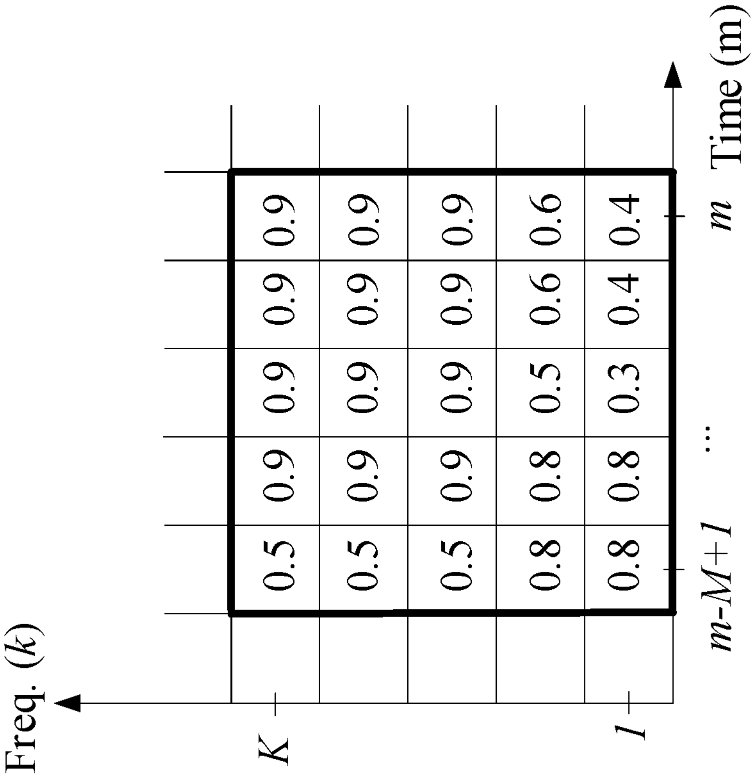
FIG. 4B) shows SPPs ($P_{k,m}$) after Max-pooling.
Figure 4A:
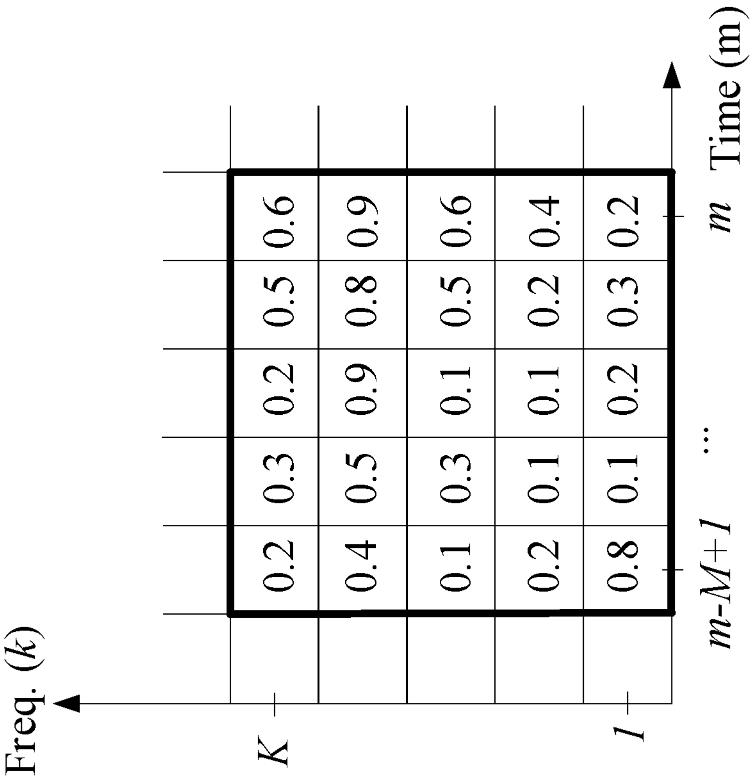

FIG. 4 shows a simple example of max-pooling with M=5, K=5, k0=1, m0=1, where FIG. 4A) shows SPPs (Pk, m) before Max-pooling; and FIG. 4B) shows SPPs (Pk, m) after Max-pooling.

The rationale of max-pooling of SPPs before combination is to take into account the observation that time-frequency tiles with high SPPs tend to convey more intelligibility if they are spread across the time-frequency plane, than if they are clustered. This is so, because in the former case, they are likely to be related to different formant frequencies, and, hence, be more informative, whereas in the latter case, they are likely to be related to the same formant frequency.

In the examples above (potentially non-linearly transformed) SPPs are combined by addition. Obviously, other ways of combining SPPs exist, e.g., multiplication, etc.

In a final embodiment, the mapping function $f(.)$ is a data-driven model, learned from training data. In particular, $f(.)$ could be a deep neural network whose parameters could be learned offline—before actual system deployment—using training data consisting of estimated SPPs $P_{k,m'}$, k=1, . . . , K; m'=m−M+1, . . . m, for a particular noise/processed segment of a speech signal (i.e., input to the data-driven model $f(.)$) along with ground truth speech intelligibility of that speech segment, as measured in listening tests with human test subjects, i.e., desired output of the data-driven model $f(.)$. Details of the approach for training deep neural networks for intelligibility prediction is described in [Pedersen et al.; 2020], but this work differs from the proposed approach, because it does not rely on SPPs and assumes access to a noise-free reference signal.

The procedure for deriving an intelligibility index described so far has not taken into account any potential hearing deficits of the device user. This may not be a problem, if the intelligibility index is simply used to decide if an algorithm setting (A) leads to higher intelligibility than another setting (B). However, in general, it could be useful to incorporate the effect of a hearing loss in the intelligibility prediction algorithm. Several options exist for incorporating prior knowledge of such hearing deficits.

For example, for the statistical model based SPP estimation methods mentioned above, the hearing loss may be modelled crudely as an imaginary additive noise term—spectrally (and potentially temporally) shaped according to the hearing loss profile in question—and added to the acoustic noisy signal in question for deriving mathematically the SPPs. The derived SPPs will generally be reduced due to the presence of the imaginary noise term, reflecting the fact that certain speech cues will be harder to detect for the hearing impaired end user.

Similarly, for the learning based SPP estimation methods described above, the noise signal simulating the hearing loss is simply physically added to the noisy signals during training of the SPP estimation algorithm. As for the statistical model based SPP estimation methods, the output SPP estimates of the learning based algorithms will generally be reduced due to the presence of the additional "hearing loss" noise.

Figure 5:
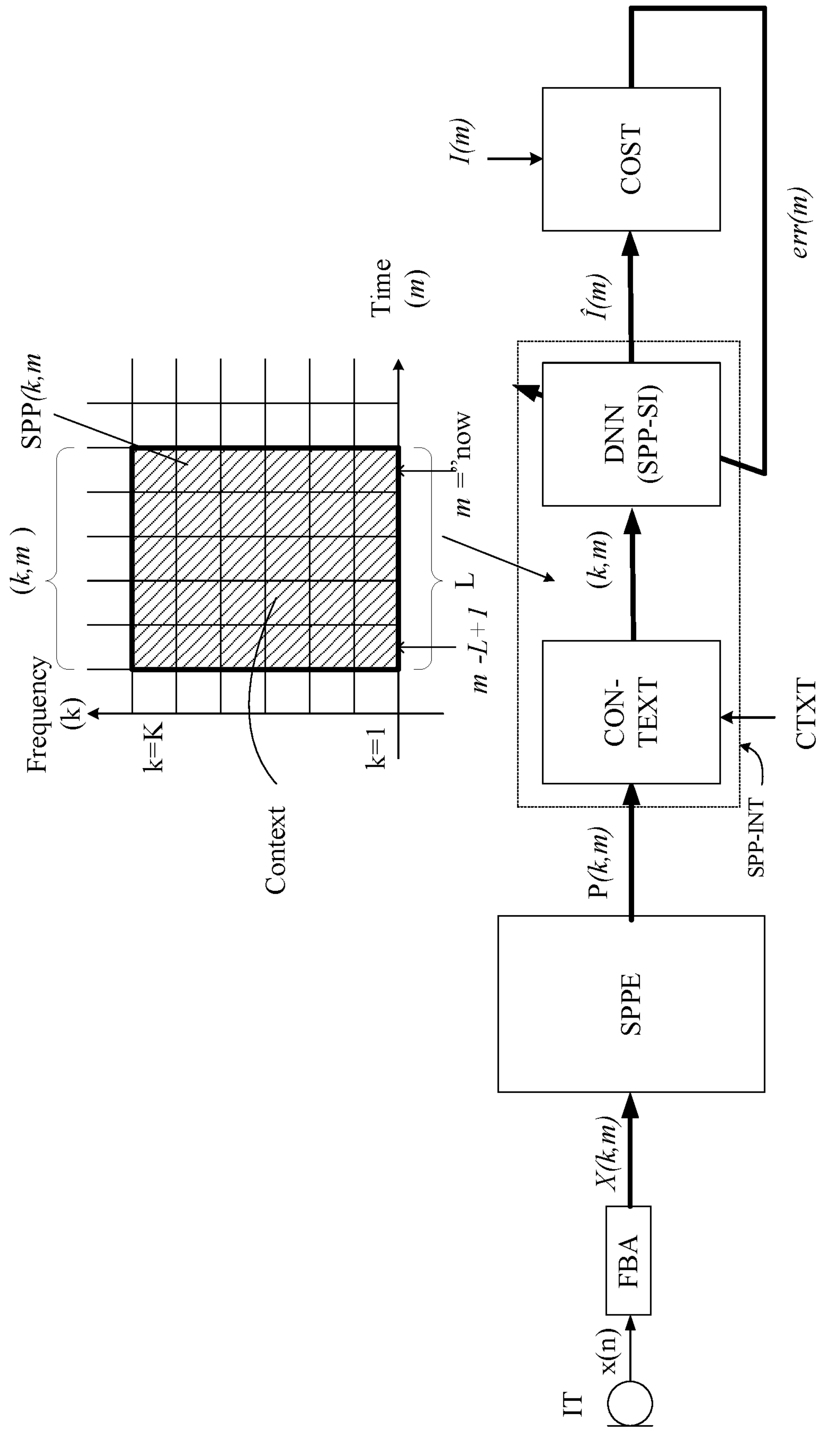
FIG. 5 shows an exemplary block diagram for training of a neural network for estimating a current speech intelligibility of an input word or sentence based on current and past speech presence probabilities.

FIG. 5 shows an exemplary block diagram for training of an algorithm, e.g. a neural network, such as a deep neural network DNN (DNN(SPP-SI)), for estimating the speech presence probability $\hat{I}$ for a particular word or sentence. The trained DNN is represented by a parameter set comprising optimized weights and possibly bias and/or non-linear function parameters. The circuit for training the neural network DNN comprises an input transducer (IT), e.g. a microphone for capturing environment sound signals and providing an (e.g. analogue or digitized) electric input signal x(n) representative thereof, n denoting time. The microphone path comprises a transform unit for transforming the electric (e.g. time domain) input signal to another domain, e.g. an analysis filter bank FBA for (possibly digitizing and) converting the time domain electric input signal x(n) to a corresponding electric input signal X(km) in a time frequency representation, where k and m are frequency and time (frame) indices, respectively. The electric input signal X(km) is fed to Speech Presence Probability estimation unit (SPPE) for proving an estimate of a speech presence probability P(k,m). From a (practical) simplicity point of view, the test signals X(km) (associated with ground truth speech intelligibility measures ($\hat{I}$(m)) may be fed directly to the Speech Presence Probability estimation unit (SPPE). It may, however, be advantageous to include the input stage comprising microphone(s), analysis filter bank(s) (and possible beamformers applied to the microphone signals before being fed to the Speech Presence Probability estimation unit (SPPE)) and the SPP-estimator (SPPE) in the actual training setup to thereby resemble the subsequent processing of the acoustic input signal in the hearing aid comprising the trained speech intelligibility estimator (SIE) as much as possible.

As indicated, other 'input stage' configurations than shown on FIG. 5 may be used, e.g. more than one input transducer, e.g. a beamformer, e.g. another transform or mapping unit(s) than the analysis filter bank(s), a particular speech presence probability estimator (e.g. as known from the prior art, or a proprietary solution) may be used. It is however advantageous that the same configuration is applied in the hearing aid that is to host the speech intelligibility estimator (SIE) with the optimized (trained) parameters determined in the training process described in the following.

The training setup comprises a context unit (CONTEXT) for providing an appropriate input vector Z(k,m) to the neural network (DNN (SPP-SI)) to be trained. The context (cf. hatched part of time-frequency map denoted 'Context' in the top part of FIG. 5, and also comprised in the input vector denoted Z(k,m)) may be controlled via input control CTXT, e.g. via a user interface. It may, however, be predetermined, e.g. fixed in advance of the training procedure. A simple control may be to use the number of historic time-frequency tiles (or frames) that should be included in the input vector Z(k,m). A specific time may also be used to control the context applied in the training of the parameters of the speech intelligibility estimator (SIE), e.g. corresponding to the average length of a word or sentence, or a number of sentences, as pronounced by a speaker.

The training data comprises a larger number of words or numbers or sentences (e.g. hundreds or thousands, but ideally many more (e.g. as many as possible)), e.g. spoken by a number of different speakers' (e.g. at different signal-to-noise ratios, using different noise types, etc.) and associated (e.g. average) speech intelligibility measures (e.g. provided by different listeners), e.g. provided by listening tests or by an algorithm having been trained with data from listening tests, cf. e.g. EP3514792A1.

A noisy time domain training signal (x(n)) is passed through an analysis filter bank (FBA), providing frequency sub-band (time-frequency domain) signals X(k m). For a particular time instant m', noisy signals representing a particular time segment of test data (e.g. a word, sentences, etc.) are passed through Speech Presence Probability estimation unit (SPPE) providing speech presence probability estimates P(k,m') for each frequency index k=1, . . . , K.

The SPPE-unit provides speech presence probability estimates P(k,m) for each time-frequency tile (k,m) to the context unit (CONTEXT) to build a desired input vector Z(k,m). to the neural network (DNN (SPP-SI)) to be trained. For a given time instant m=m', the estimated value $\hat{I}(m')$, of the speech intelligibility measure is estimated by the neural network using present and past values of the speech presence probability estimate, P(k, m), k=1, . . . , K; m=m'−L+1, . . . , m', where L denotes the number of past frames used to estimate I(m'). The number L of frames represents the 'history' of the SPP estimates that is included in the estimation of speech intelligibility measure. With a view to the general nature of speech, the 'history' (L) may e.g. include up to 10 s of the input signal (SPP estimates), e.g. representing a few sentences.

The input vector Z(k,m) to the neural network may thus comprise a number of time frequency values of the speech presence probability P(k,m), k=1, . . . , K; m=m'−L+1, . . . , m', (e.g. real numbers between 0 and 1) as illustrated by the top time-frequency (TF) map in FIG. 5. The values of the input vector may be subject to a functional 'transformation' (e.g. logarithm) before being fed to the first layer of the neural network, if appropriate. In the time-frequency map insert in the top part of FIG. 5, the frequency range represented by indices k=1, . . . , K may be the full operational range of the hearing device in question (e.g. representing a frequency range between 0 and 12 kHz (or more)), or it may represent a more limited sub-band range (e.g. where speech elements are expected to be located, e.g. between 0.5 kHz and 8 kHz, or between 1 kHz and 4 kHz). The limited sub-band range may contain a continuous range or selected sub-ranges between k=1 and k=K.

SPP input vectors Z(k, m') for given time instants m=m', e.g., comprising speech presence probability estimates P(k, m), k=1, . . . , K; m=m'−L+1, . . . , m', corresponding to a word or one or more sentences, as appropriate, and corresponding ground truth speech intelligibility values I(m') for said word or one or more sentences, are used to train the (e.g. deep) neural network (DNN (SPP-SI)). Using the neural network, we wish to provide an estimate I(m'), 'now' (=m') (corresponding to the current word(s) or sentence(s), if any, present in the input data) based on L observations (L time frames) up to (and including) time 'now' (see e.g. time-frequency map insert in the top part of FIG. 5). The network parameters are collected in a set denoted by DNN*. Typically, this parameter set encompasses weight and bias values associated with each network layer. The network may be a feedforward multi-layer perceptron, a convolutional network, a recurrent network, e.g., a long short-term memory (LSTM) network, a gated recurrent unit (GRU), or combinations of these networks. Other network structures are possible. The output layer of the network may have a logistic (e.g. sigmoid) output activation function to ensure that outputs ($\hat{I}(m')$) are constrained to the range 0 to 1. The network parameters may be found using standard, iterative, steepest-descent methods, e.g., implemented using back-propagation (cf. e.g. [4]), minimizing e.g. the mean-squared error (MSE), cf. e.g. signal err(m') provided by optimization algorithm (COST), between the network output $\hat{I}(l')$ and the ground truth I(m'). The mean-squared error is computed across many training pairs of the ground truth speech intelligibility measures I(m) and noisy signals X(k, m).

Figure 6A:
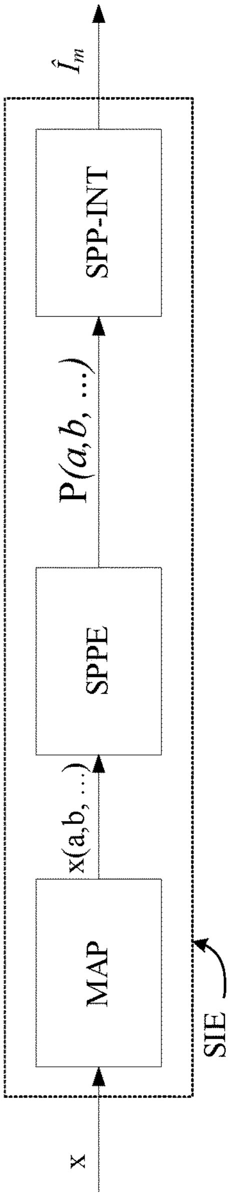
FIG. 6A shows an exemplary speech intelligibility estimator (or predictor) according to the present disclosure, and FIG. 6B schematically shows an embodiment of a hearing aid comprising a speech intelligibility estimator (or predictor) according to the present disclosure.

FIG. 6A shows an exemplary speech intelligibility estimator (SIE) according to the present disclosure. The speech intelligibility estimator (SIE) is similar to the one shown in FIG. 1 apart from the embodiment of FIG. 6A additionally comprising a mapping unit (MAP) configured to provide a mapping of input signal (x) from a first domain having a first dimension to a second domain having a second dimension. The mapping may be a non-linear or linear mapping. The second dimension may be equal to or different from the first dimension. The second domain may have more dimensions than the first. For example, the first domain may be short-time spectrograms, e.g., a (log-)spectrogram of the recent past compared to m'="now". These short-time-spectrograms may be mapped into the (Temporal) Modulation Domain, in which case the second domain would have dimensions (time, acoustic frequency, modulation frequency), i.e., 3-dimensional. The second domain may e.g. also be a spectro-temporal modulation domain with four dimensions (time, acoustic frequency, temporal modulation frequency, spectral modulation frequency).

The mapping unit may represent a Fourier transformation or any other transform process for transformation from one domain to another domain (e.g. a Discrete Cosine Transform (DCT) or the Karhunen Loéve Transform (KLT), a Temporal transformation, a Spectro-Temporal modulation, etc.). An inverse mapping unit (or another (possibly different) mapping unit) may be applied in the hearing aid at any appropriate location appropriate for the design in question to bring the signal in question to a domain (e.g. time-frequency domain or time domain) as suitable for the specific solution. As indicated in FIG. 6A, the mapping unit (MAP) transforms the input (e.g. time domain) signal x to a mapped domain (e.g. transform domain) signal x(a, b, . . . ), e.g. having a higher dimension, and depending on a number (e.g. a multitude) of parameters (a, b, . . . ). The speech presence probability estimator (SPPE) is configured to provide the speech presence probability estimate P in the mapped domain (P(a, b, . . . )). The speech presence probability estimate (P(a, b, . . . )) is fed to the speech presence probability integrator (SPP-INT) providing the speech intelligibility estimate ( ), either in the mapped domain or in the time domain as SI-estimate ($\hat{I}_m$). Hence, the speech intelligibility estimator (SIE) may comprise an inverse mapping unit. An inverse mapping unit may e.g. form part of a neural network implementing the speech presence probability integrator (SPP-INT), as discussed in connection with FIG. 5.

Figure 6B:
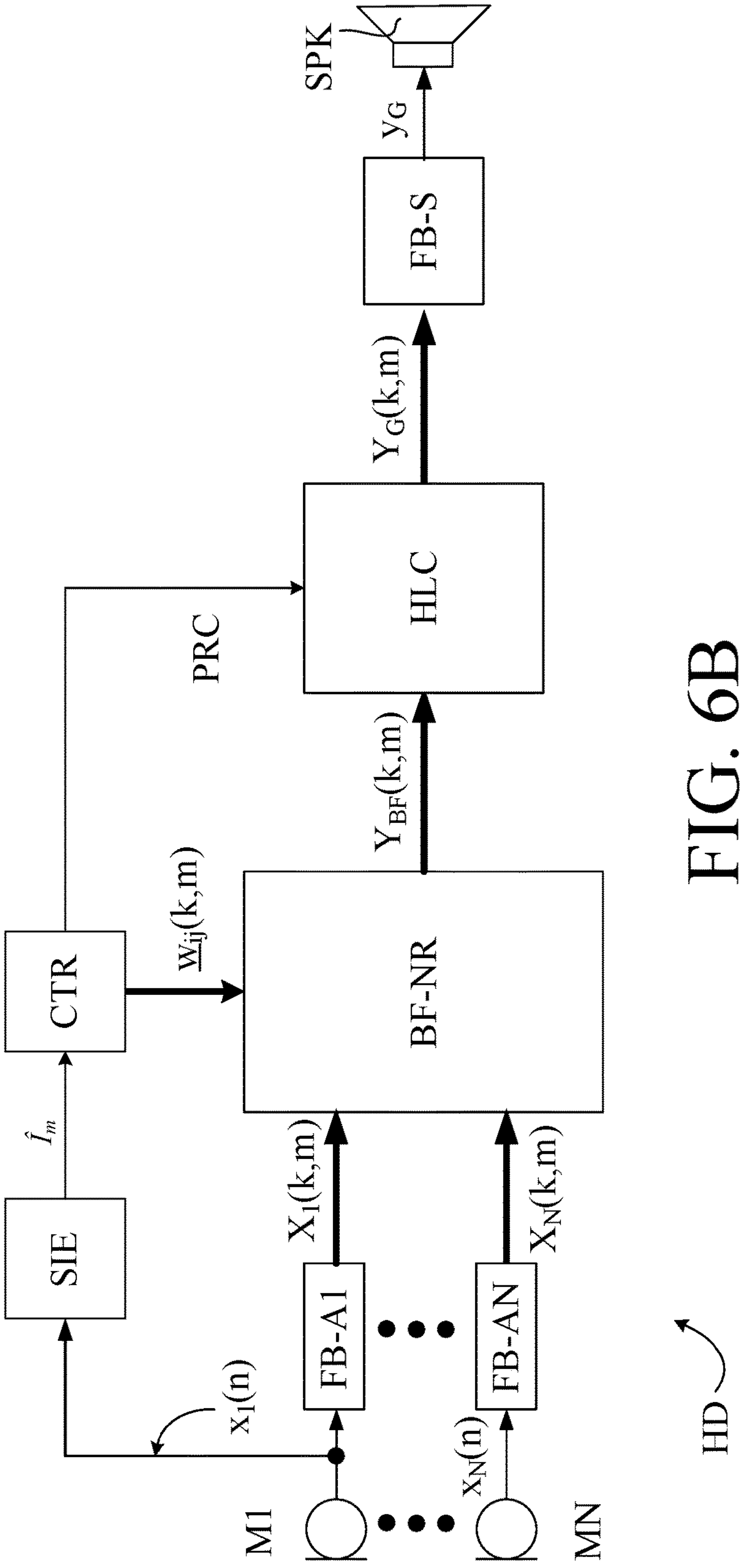

FIG. 6B schematically shows an embodiment of a hearing aid (HD) comprising a speech intelligibility estimator (SIE) according to the present disclosure. The hearing aid (HD) comprises a multitude of microphones (Mi, i=1, . . . , N) providing a different one of a multitude of electric input signals ($x_i$(n) i=1, . . . N, n representing time). The multitude of electric input signals are e.g. digitized and provided as digital samples (in the time domain), e.g. by corresponding analogue to digital converters, as appropriate. Each microphone path comprises an analysis filter bank (FB-A1, . . . , FB-AN) each providing an electric input signal $x_i$ in the time-frequency domain. The N analysis filter banks provide respective electric input signals $X_i$, i=1, . . . , N in a time-frequency representation (k,m). The N electric input signals $X_i$(k,m), i=1, . . . , N, are fed to a beamformer-noise reduction system (BF-NR) providing a beamformed (and possibly further noise reduced signal) $Y_{BF}$(k,m). The beamformed signal is fed to signal processing unit (HLC) for applying a number of signal processing algorithms to the beamformed signal (or a signal originating therefrom), e.g. a hearing loss compensation algorithm (compressor) for providing a frequency and level dependent gain to compensate for the user's hearing impairment. Other processing algorithms may be applied to the signal by the processing unit (HLC) providing a processed signal $Y_G$(km). The processed signal $Y_C$(km) in the time-frequency domain is converted to a time domain signal $y_G$(n) by synthesis filter bank (FB-S). The time domain signal $y_G$(n) is forwarded to an output transducer, here loudspeaker (SPK), for providing stimuli perceivable to the user as sound. The above described units and interconnecting signals represent a forward (audio processing) path of the hearing aid.

In the embodiment of FIG. 6B, a multitude of input transducers (microphones) and a beamformer are shown. A hearing device comprising a single input transducer (e.g. a microphone) may, however, also be provided according to the present disclosure.

The hearing aid further comprises an analysis path, here comprising a speech intelligibility estimator (SIE) according to the present disclosure. The speech intelligibility estimator (SIE) provides an estimate of speech intelligibility $\hat{I}$ of a given electric input signal of the forward path, here shown as time domain signal $x_i$(n) from microphone MI. The analysis path further comprises a control unit (CTR)(e.g. a controller) configured to provide appropriate parameters for use in the signal processing of the forward path in dependence of the current estimate of speech intelligibility $\hat{I}$. In the embodiment of FIG. 6B, the controller is configured to control the beamformer in dependence of the estimate of speech intelligibility L. Here, beamformer weights $w_{ij}$(k,m) are determined by the controller (CTR) in dependence of $\hat{I}$(m). The beamformer weights may be controlled to decrease focus of the beamformer (increase omni-directionality), the higher the estimate of speech intelligibility $\hat{I}$(m). Correspondingly, the beamformer weights may be controlled to increase focus of the beamformer, the lower the estimate of speech intelligibility I(m). A postfilter for attenuating noise in the spatially filtered signal from the beamformer may also benefit from receiving the estimate of speech intelligibility $\hat{I}$(m), e.g. to make noise reduction less aggressive, the higher the estimate of speech intelligibility $\hat{I}$(m) (and vice versa). Signal processing algorithms of the signal processing unit (HLC) may likewise benefit from information about the estimate of speech intelligibility $\hat{I}$(m), cf. processing control signal (PRC) from the control unit (CTR) to the signal processing unit (HLC).

Other signals of the forward than the time domain electric input signal ($x_i$(n)) may alternatively or additionally be provided with an analysis path comprising a comprising a speech intelligibility estimator (SIE) according to the present disclosure. This may e.g. be one or more of the time-frequency domain signals $X_i$(k,m), the beamformed signal $Y_{BF}$(km), or the processed signal (either in time-frequency domain $Y_G$(km) or in time domain $y_G$(n), or any intermediate signal of the forward path, e.g. depending on the applied processing algorithms).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[ANSI; 1995] American National Standards Institute, "ANSI S3.5, Methods for the Calculation of the Speech Intelligibility Index," New York 1995.

[Rhebergen & Versfeld; 2005] K. S. Rhebergen and N. J. Versfeld, "A speech intelligibility index based approach to predict the speech reception threshold for sentences in fluctuating noise for normal-hearing listeners," J. Acoust. Soc. Am., vol. 117, no. 4, pp. 2181-2192, 2005.
[Taal et al.; 2011] C. H. Taal, R. C. Hendriks, R. Heusdens, and J. Jensen, "An Algorithm for Intelligibility Prediction of Time-Frequency Weighted Noisy Speech," IEEE Trans. Audio, Speech, Lang. Process., vol. 19, no. 7, pp. 2125-2136, September 2011.
[Edraki et al.; 2020] A. Edraki, W.-Y. Chan, J. Jensen, and D. Fogerty, "Speech Intelligibility Prediction Using Spectro-Temporal Modulation Analysis" IEEE/ACM Transactions on Audio, Speech and Language Processing, 2020, pp. 210-225.
[Hoang et al.; 2021] P. Hoang, Z.-H. Tan, J. M. de Haan, J. Jensen, "Joint Maximum Likelihood Estimation of Power Spectral Densities and Relative Acoustic Transfer Functions for Acoustic Beamforming," Proc. ICASSP 2021 (to appear).
EP3057335A1 (Oticon) Aug. 17, 2016.
EP3220661A1 (Oticon) Sep. 20, 2017.
EP3203473A1 (Oticon) Aug. 9, 2017.
EP3598777A2 (Oticon) Jan. 22, 2020.
EP3514792A1 (Oticon) Jul. 24, 2019.
[Edraki et al.; 2020] A. Edraki, W.-Y. Chan, J. Jensen, and D. Fogerty, "Speech Intelligibility Prediction Using Spectro-Temporal Modulation Analysis" IEEE/ACM Transactions on Audio, Speech and Language Processing, 2020, pp. 210-225.
[Heymann, et al.; 2017] J. Heymann, L. Drude, R. Haeb-Umbach, "A generic neural acoustic beamforming architecture for robust multi-channel speech processing," Computer Speech and Language, Vol. 46, November 2017, pp, 374-385.
[Pedersen et al.; 2020] M. B. Pedersen, A. H. Andersen, S. H. Jensen, and J. Jensen, "A Neural Network for Monaural Intrusive Speech Intelligbility Prediction," ICASSP, pp. 336-340, May 2020.

The invention claimed is:

1. A hearing device adapted for being worn by a user, the hearing device comprising an input unit configured to provide at least one time-variant electric input signal representing sound, the at least one electric input signal comprising target signal components and optionally noise signal components, the target signal components originating from a target sound source;

a signal processing unit for processing the at least one electric input signal and providing a processed signal;

an output unit for creating output stimuli configured to be perceivable by the user as sound based on the processed signal from the signal processing unit;

a speech presence probability prediction unit for repeatedly providing a measure of a predicted speech presence probability of the at least one electric input signal, or of a signal originating therefrom;

a speech intelligibility prediction unit for repeatedly providing a current measure of a predicted speech intelligibility of the at least one electric input signal, or of a signal originating therefrom, and wherein said speech intelligibility prediction unit is configured to determine said current measure of the predicted speech intelligibility in dependence of said measure of the predicted speech presence probability.

2. A hearing device according to claim 1 wherein the speech intelligibility prediction unit is configured to determine said current measure of the predicted speech intelligibility as a function ($f(.)$) of a present value and a number of past values of said measure of the predicted speech presence probability.

3. A hearing device according to claim 2 wherein the speech intelligibility prediction unit is configured to determine said current measure of the predicted speech intelligibility in dependence of an, optionally normalized, sum of said present value and said number of past values of said measure of the predicted speech presence probability.

4. A hearing device according to claim 2 wherein the speech intelligibility prediction unit is configured to determine said current measure of the predicted speech intelligibility in dependence of a weighted sum of said present value and said number of past values of said measure of the predicted speech presence probability.

5. A hearing device according to claim 2 configured to provide that said function ($f(.)$) is a data-driven model, learned from training data.

6. A hearing device according to claim 5 configured to provide that said function $f(.)$ is provided by a deep neural network whose parameters are learned offline—before use of the hearing device—using training data comprising estimated speech presence probabilities $P_{k,m'}$, k=1, . . . , K; m'=m−M+1, . . . m, for a particular noisy or processed time segment of a speech signal along with ground truth speech intelligibility of that speech segment, k being a frequency band index, m being a time index.

7. A hearing device according to claim 1 comprising a mapping unit configured to provide a mapping of said at least one electric input signal from a first domain having a first dimension to a second domain having a second dimension, wherein said mapping is a non-linear or linear mapping, and wherein said second dimension is equal to or different from said first dimension.

8. A hearing device according to claim 1 wherein said input unit is configured to provide said at least one electric input signal in a transform domain representation.

9. A hearing device according to claim 1 wherein said input unit is configured to provide said at least one electric input signal in a time-frequency representation (k,m), k being a frequency band index, m being a time index.

10. A hearing device according to claim 9 wherein the speech presence probability prediction unit is configured to determine said current measure of the predicted speech intelligibility in a number of time frequency units (k,m).

11. A hearing device according to claim 6 wherein the speech intelligibility prediction unit is configured to determine said current measure of the predicted speech intelligibility as a function of a present value and a number of past values of said measure of the predicted speech presence probability, wherein said present and said number of past values is M×K, where M is a number of time units and K is a number of frequency units.

12. A hearing device according to claim 1 wherein the signal processing unit comprises at least one processing algorithm configured to be applied to the at least one electric input signal or a signal or signals originating therefrom.

13. A hearing device according to claim 12 wherein the at least one processing algorithm comprises a noise reduction algorithm.

14. A hearing device according to claim 12 wherein the controller is configured to provide one or more processing parameters of the at least one processing algorithm, and wherein the one or more processing parameters is provided in dependence of the current measure of the predicted speech intelligibility.

15. A hearing device according to claim 1 comprising a controller (CTR) configured to provide appropriate processing parameters for use in the processing of the at least one electric input signal, or a signal or signals originating therefrom, in dependence of the current measure of the predicted speech intelligibility ($\hat{I}$).

16. A hearing device according to claim 15 wherein the input unit is configured to provide at least two time-variant electric input signals representing sound, and wherein the hearing aid comprises a beamformer configured to provide a beamformed signal in dependence of said at least two time-variant electric input signals and adaptively updated beamformer weights ($w_{ij}$) wherein the controller is configured to control the beamformer in dependence of the current measure of the predicted speech intelligibility ($\hat{I}$).

17. A hearing device according to claim 16 wherein the controller is configured to control the beamformer weights ($w_{ij}(k,m)$) in dependence of the current measure of the predicted speech intelligibility ($\hat{I}(m)$) to increase omni-directionality of the beamformer, the higher the current measure of the predicted speech intelligibility ($\hat{I}(m)$).

18. A hearing device according to claim 1 being constituted by or comprising a hearing aid, a headset, an earphone, an ear protection device, or a combination thereof.

19. A method of operating a hearing device adapted for being worn by a user, the method comprising providing at least one time-variant electric input signal representing sound, the at least one electric input signal comprising target signal components, and optionally noise signal components, the target signal components originating from a target sound source;

processing the at least one electric input signal and providing a processed signal;

creating output stimuli configured to be perceivable by the user as sound based on the processed signal;

repeatedly providing a measure of a predicted speech presence probability of the at least one electric input signal, or of a signal originating therefrom;

repeatedly providing a measure of a predicted speech intelligibility of the at least one electric input signal, or of a signal originating therefrom, and determining said current measure of the predicted speech intelligibility in dependence of said measure of the predicted speech presence probability.

20. A non-transitory computer readable medium storing a computer program comprising instructions which, when the program is executed by a computer, cause the computer to carry out the method of claim 19.

* * * * *